(12) United States Patent
Takahashi

(10) Patent No.: US 7,899,261 B2
(45) Date of Patent: Mar. 1, 2011

(54) IMAGING DEVICE THAT GENERATES PHOTOGRAPHIC IMAGE DATA

(75) Inventor: Kazuhiro Takahashi, Kawasaki (JP)

(73) Assignee: Nikon Corporation, Tokyo (JP)

( * ) Notice: Subject to any disclaimer, the term of this patent is extended or adjusted under 35 U.S.C. 154(b) by 939 days.

(21) Appl. No.: 11/482,159

(22) Filed: Jul. 7, 2006

(65) Prior Publication Data

US 2007/0009164 A1  Jan. 11, 2007

(30) Foreign Application Priority Data

Jul. 11, 2005  (JP) ............................... 2005-201251

(51) Int. Cl.
    *G06K 9/36* (2006.01)
    *G06K 9/46* (2006.01)
(52) U.S. Cl. ...................... 382/239; 382/232
(58) Field of Classification Search ................. 382/239, 382/232, 270
    See application file for complete search history.

(56) References Cited

U.S. PATENT DOCUMENTS

| | | | | |
|---|---|---|---|---|
| 5,184,212 | A * | 2/1993 | Yamamoto et al. | 348/234 |
| 5,699,457 | A * | 12/1997 | Adar et al. | 382/239 |
| 5,923,787 | A * | 7/1999 | Hara et al. | 382/251 |
| 5,937,100 | A * | 8/1999 | Kitajima | 382/251 |
| 6,330,369 | B1 * | 12/2001 | Cornog et al. | 382/251 |
| 6,697,529 | B2 * | 2/2004 | Kuniba | 382/239 |
| 6,943,833 | B1 * | 9/2005 | Kuniba et al. | 348/231.1 |
| 6,990,243 | B1 * | 1/2006 | Kuniba et al. | 382/239 |
| 7,133,148 | B2 * | 11/2006 | Silverstein | 358/1.15 |
| 2003/0086079 | A1 * | 5/2003 | Barth et al. | 356/124.5 |
| 2004/0156551 | A1 | 8/2004 | Nishiyama | |
| 2004/0252201 | A1 * | 12/2004 | Meitav et al. | 348/211.3 |
| 2005/0068425 | A1 | 3/2005 | Matsutani | |
| 2008/0019611 | A1 * | 1/2008 | Larkin et al. | 382/287 |

FOREIGN PATENT DOCUMENTS

| | | |
|---|---|---|
| JP | A-9-247675 | 9/1997 |
| JP | A-9-261636 | 10/1997 |
| JP | A-10-150633 | 6/1998 |
| JP | B2 3427820 | 5/2003 |
| JP | A-2003-199041 | 7/2003 |

OTHER PUBLICATIONS

Dec. 14, 2010 Office Action issued in Japanese Patent Application No. 2005-201251 (with partial translation).

* cited by examiner

*Primary Examiner*—Samir A Ahmed
*Assistant Examiner*—Li Liu
(74) *Attorney, Agent, or Firm*—Oliff & Berridge, PLC

(57) ABSTRACT

An imaging device has an image pickup section, a compression processing section, a correlation data holding section, and first and second calculating sections. The image pickup section generates photographic image data. The compression processing section performs compression processing on photographic image data. The correlation data holding section holds plural correlation data on changes in scale factor and compressed data amount of sample image data. The first calculating section calculates initial scale factors from standard correlation data generated from image data including high-frequency components most among sample image data and target compressed data amount. The second calculating section determines whether recompression processing by use of a different scale factor is necessary from a difference between target compressed data amount and compressed photographic image data amount and calculates the scale factor based on compressed photographic image data and correlation data at recompression processing such that the data compression rate decreases.

11 Claims, 5 Drawing Sheets

IMAGING DEVICE THAT GENERATES PHOTOGRAPHIC IMAGE DATA

CROSS REFERENCE TO RELATED APPLICATION

This application is based upon and claims the benefit of priority from Japanese Patent Application No. 2005-201251, filed on Jul. 11, 2005, the entire contents of which are incorporated herein by reference.

BACKGROUND OF THE INVENTION

1. Field of the Invention

The present invention relates to an imaging device that generates a photographic image data by photoelectrically converting an object image.

2. Description of the Related Art

In general, in an electronic camera, image data is subjected to compression coding processing in order to efficiently record a photographic image in a recording medium. A typical JPEG (Joint Photographic Experts Group) compression process is as follows. First, image data is divided into pixel blocks of about 8×8 pixels. Next, the image data is transformed into spatial frequency components by performing orthogonal transformation such as a DCT (discrete cosine transform) on the image block. Further, the DCT coefficient is subjected to quantization processing in accordance with each frequency component. Then, the quantized value is coding processed. Finally, the compression-coded image data is recorded in a recording medium etc.

Here, in compression-coded image data, in general, the code amount of an image of fine picture pattern is large, and conversely, the code amount of a smooth image is small. Therefore, the code amount differs in each compressed image, which causes a problem in managing recording capacity.

In view of this problem, in the above-mentioned quantization processing, a quantization table in which units of quantization are defined for the respective spatial frequency components is multiplied by a coefficient called a scale factor to create a quantization table optimized for each image. In general JPEG compression, the value of the scale factor is adjusted by repeating compression several times so that the final code amount falls within a desired range (refer to Japanese Patent No. 3427820). Note that in the same image data, the greater the scale factor, the larger the compression rate.

In the above-mentioned compression process, the compression-coded image data is recorded in a buffer memory temporarily. The smaller the recording region of the buffer memory assigned to processing of one frame is, the more the number of continuous frames at the time of continuous shooting increases.

However, in the compression coding processing of a conventional electronic camera, an initial scale factor is set in general using statistically average image data as a reference. When a shot image contains high-frequency components more than the above-mentioned reference image does, the code amount thereof after compression may exceed the target code amount.

Therefore, typically, the recording region of the buffer memory assigned to the processing of one frame is larger than the target code amount in order to prevent overflow. Because of this, the buffer memory is not used efficiently, which requires an improvement.

SUMMARY OF THE INVENTION

The present invention is directed to solve the above-mentioned conventional technical problems. An object of the present invention is to provide an imaging device which allows an amount of image data after compression processing to fall within the range of target compressed data amounts and which can effectively utilize a recording region of a buffer memory.

The present invention is described below.

An imaging device according to a first aspect of the present invention has an image pickup section, a compression processing section, a correlation data holding section, a first calculating section, and a second calculating section. The image pickup section generates photographic image data by photoelectrically converting an object image obtained by an optical shooting system. The compression processing section performs compression processing on photographic image data. The correlation data holding section holds a plurality of pieces of correlation data representing a correlation between a change in a scale factor for a data compression rate and a change in compressed data amount of sample image data. The first calculating section calculates an initial scale factor from the target compressed data amount and the standard correlation data which is generated from image data that includes high-frequency components most among the sample image data. The second calculating section determines whether or not recompression processing need to be performed by use of a different scale factor, according to a difference between the target compressed data amount and an amount of compressed photographic image data, and when the recompression processing is performed, calculates a scale factor according to the compressed photographic image data and the correlation data so that the data compression rate is decreased.

According to a second aspect of the present invention, the standard correlation data in the first aspect is generated according to test pattern image data whose cyclic variation of a pattern in horizontal and vertical directions corresponds to a Nyquist frequency of the image pickup section.

According to a third aspect of the present invention, the second calculating section in the first and second aspects performs a different processing from a previous one at the recompression processing.

According to a fourth aspect of the present invention, when determining whether or not recompression processing needs to be performed, the second calculating section in the third aspect increases stepwise an allowable range of the difference between the target compressed data amount and the amount of compressed photographic image data.

According to a fifth aspect of the present invention, at the second and subsequent recompression processings the second calculating section in the third and fourth aspects calculates the scale factor by an arithmetic expression different from a previous one in a rate of change of the compressed data amount and the scale factor.

An imaging device according to a sixth aspect of the present invention has an image pickup section, a correlation data holding section, a calculating section, and a compression processing section. The image pickup section generates photographic image data by photoelectrically converting an object image obtained by an optical shooting system. The correlation data holding section holds standard correlation data on test pattern image data which corresponds to the Nyquist frequency of the image pickup section. The standard correlation data represents a relationship between a change in a scale factor for a data compression rate and a change in compressed data amount. The calculating section finds a scale factor for compression processing according to the standard correlation data. The compression processing section performs compression processing on photographic image data based on a calculation result of the calculating section.

It is effective as specific aspects of the present invention that the configuration of the above-described present invention is applied to a method, a recording medium, a computer program, etc

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Embodiments of the present invention are described below with reference to the drawings.

First Embodiment

Figure 1:
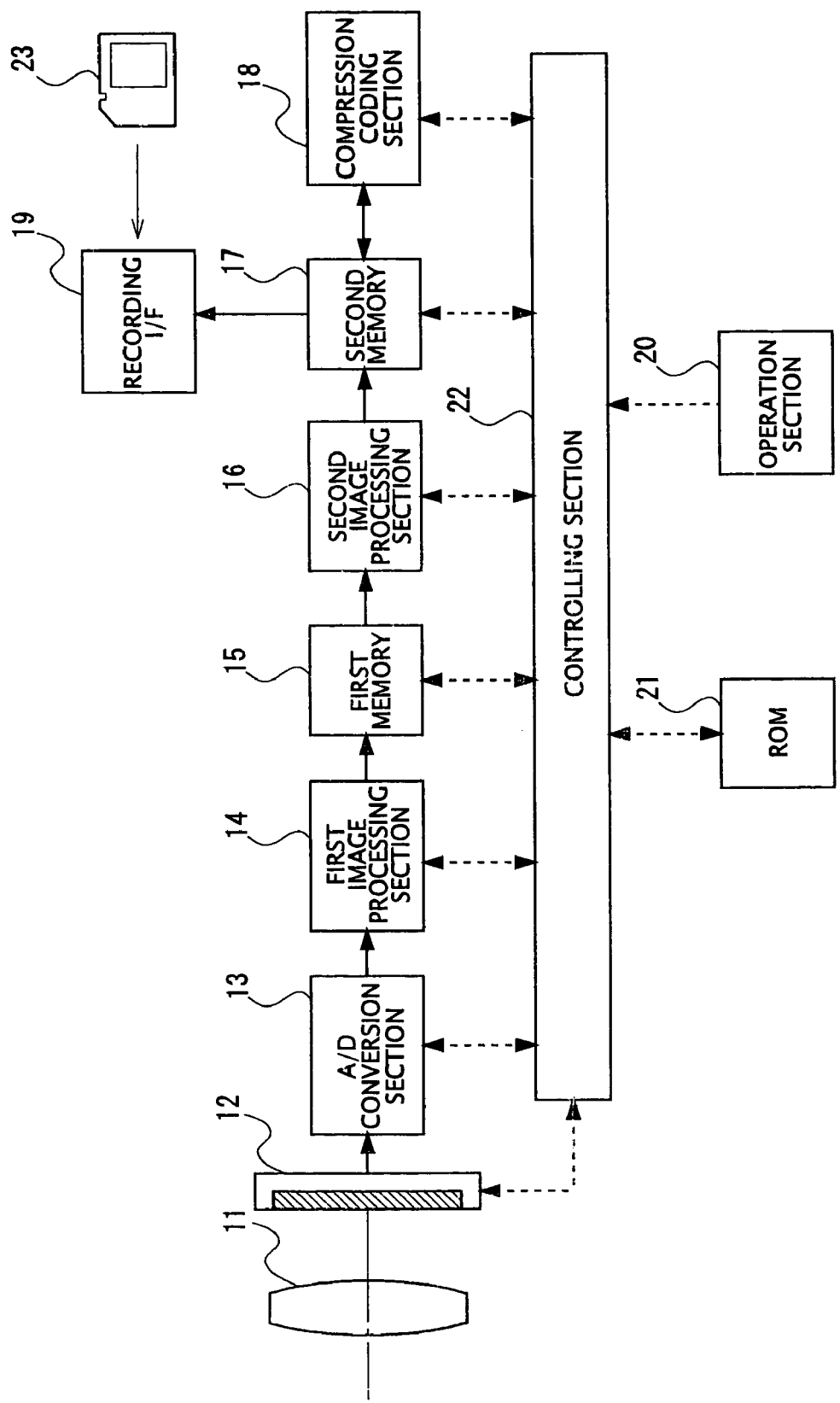
FIG. 1 is a block diagram showing a configuration of an electronic camera in a first embodiment.

FIG. 1 is a block diagram showing a configuration of an electronic camera, which is an imaging device in a first embodiment.

An electronic camera has a shooting lens 11, an image pickup device 12, an A/D conversion section 13, a first image processing section 14, a first memory 15, a second image processing section 16, a second memory 17, a compression coding section 18, a recording I/F 19, an operation section 20, a ROM 21, and a controlling section 22.

The image pickup device 12 generates an analog image signal of an object image by photoelectrically converting a ray bundle that has passed through the shooting lens 11. The A/D conversion section 13 converts the analog image signal of the image pickup device 12 into a digital image signal. The first image processing section 14 performs image processing such as defective pixel correction, black level adjustment, etc., on the digital image signal to be inputted sequentially in order of readout from the image pickup device 12. The first memory 15 temporarily stores the digital image signal outputted sequentially from the first image processing section 14 until the amount thereof is accumulated to one frame.

The second image processing section 16 performs image processing such as gamma correction, interpolation, color conversion, edge enhancement, etc., on the digital image signals corresponding to the amount of one frame to generate photographic image data. The second memory 17 temporarily stores the photographic image data in the pre-process or post-process of compression coding processing.

The compression coding section 18 performs a series of compression processings described below on the photographic image data. Specifically, the compression coding section 18 first divides the photographic image data into blocks of 8×8 pixels and calculates a DCT coefficient by performing DCT calculation processing on each block. Next, the compression coding section 18 performs quantization processing on the above-mentioned DCT coefficient based on a quantization table value to be described later. Then, the compression coding section 18 performs entropy coding processing on the quantized value by Huffman coding.

The recording I/F 19 has a connector to connect to a recording medium 23 (such as a publicly known semiconductor memory etc.) Then, the recording I/F 19 controls data write/read into/from the recording medium 23 connected to the connector.

The operation section 20 receives input of a compression mode selected by a user. Note that in the present embodiment, the compression mode is selectable from three in stages of compression rate, "FINE", "NORMAL", and "BASIC", in ascending order.

The ROM 21 stores therein a sequence program to control an electronic camera, a standard quantization table used for quantization processing by the compression coding section 18, a scale factor table, etc. The standard quantization table stores values to define the units of quantization for each DCT coefficient. The values in the standard quantization table are set so as to largely reduce an amount of data of high-frequency component which is inconspicuous to the human eye even if lost due to the human visual characteristics.

On the other hand, the above-mentioned scale factor table includes relationships between the values of a scale factor (coefficients for the compression rate) at the compression processing and the compression data amount for each of a plurality of sample image data. In addition, the scale factor table is created by repeating compression coding for each of the sample image data after the DCT transform while gradually varying the value of the scale factor and finding the value of the scale factor and the compressed data amount.

Here, the sample image data includes a photographic image data group generated by shooting different objects and scenes in advance and standard image data as a non-photographic image generated artificially. The above-mentioned standard image data is, for example, test pattern image data, such as a monochrome dot pattern generated with units of one pixel, a grating pattern, a checkered pattern, etc., and its cyclic variation in the horizontal and vertical directions corresponds to the Nyquist frequency of the image pickup device 12.

The photographic image data includes almost no high-frequency components with the Nyquist frequency since the image is deteriorated and blurs due to the shooting lens 11 and the optical lowpass filter (not shown) of the image pickup device 12. Therefore, among the above-mentioned sample image data, the standard image data whose high-frequency component is not removed optically includes the high-frequency components most.

The controlling section 22 controls operation of respective sections of an electronic camera according to the above-mentioned sequence program. Further, the controlling section 22 sets the scale factor value and calculates values of the quantization table for the compression coding of photographic image data.

Figure 2:
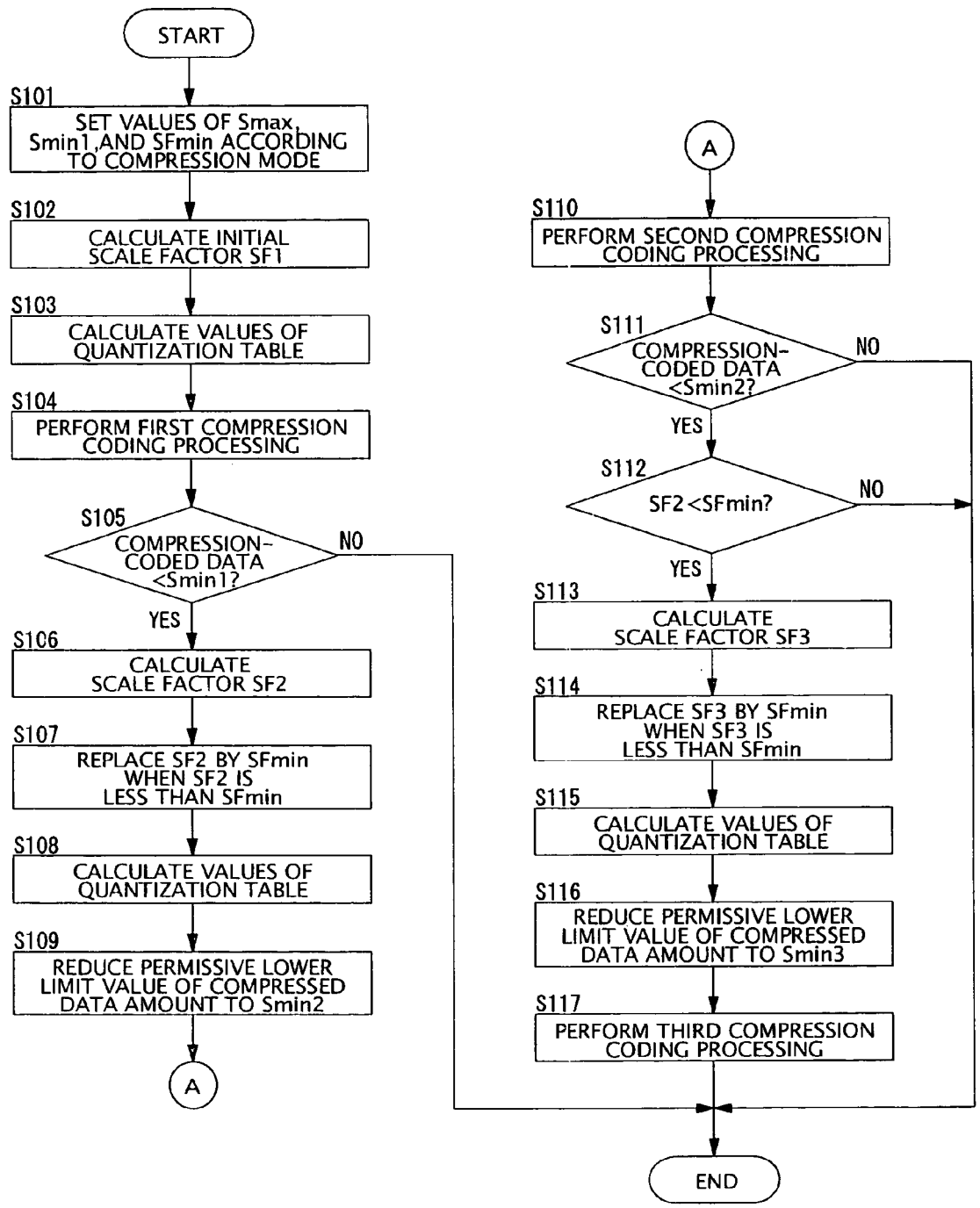
FIG. 2 is a flow chart of compression coding processing on photographic image data in the first embodiment.

Compression coding processing on photographic image data in the first embodiment is described below along the flow chart in FIG. 2.

Step S101: First, the controlling section 22 detects a set compression mode. Next, the controlling section 22 reads out a target compressed data amount Smax, an initial permissive lower limit value of the compressed data amount Smin1, and a lower limit value SFmin of the scale factor from the ROM 21 according to the selected compression mode.

Figure 3:
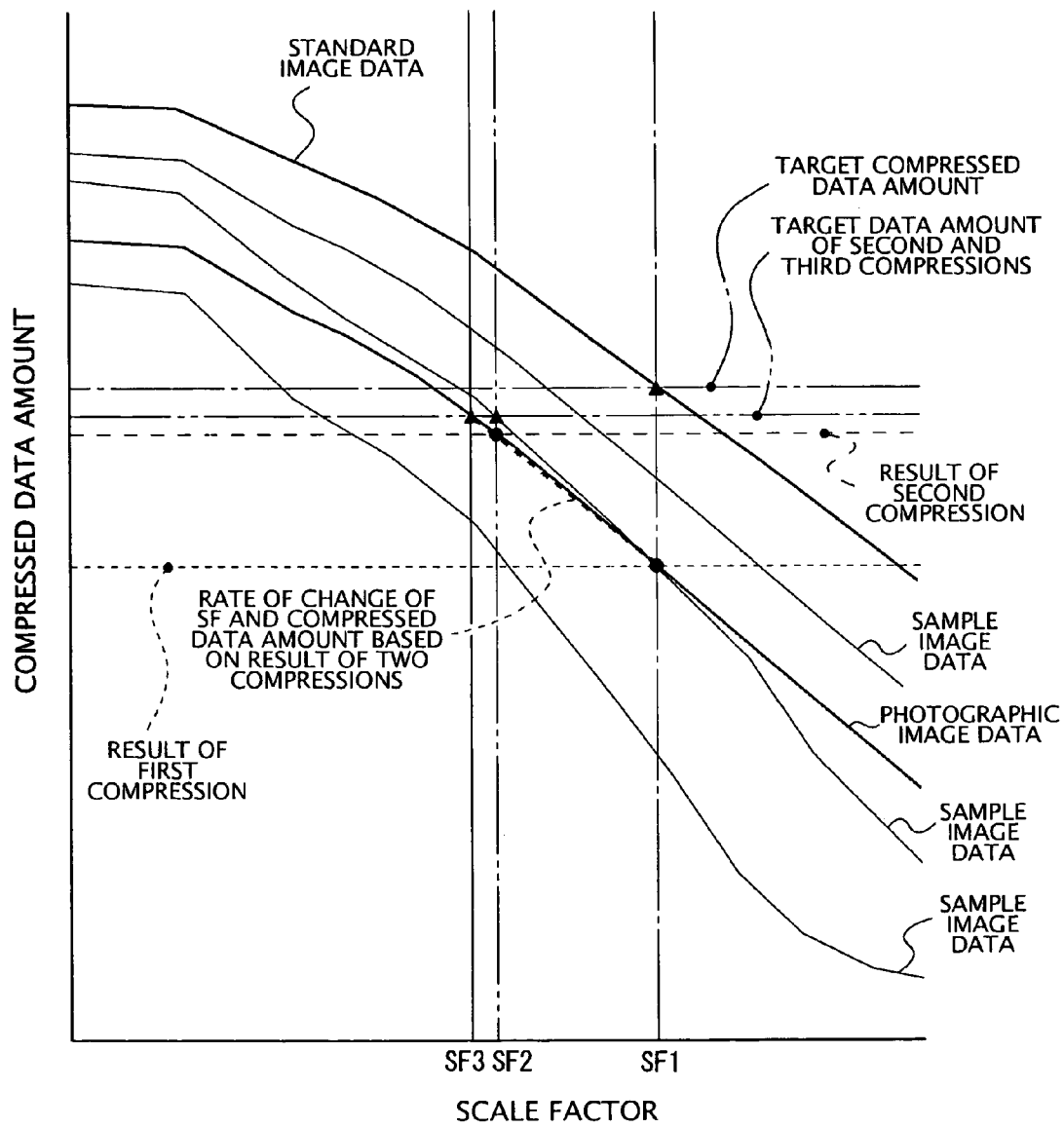
FIG. 3 is an explanatory diagram of derivation of a scale factor in the first embodiment.

Step S102: The controlling section 22 calculates an initial scale factor SF1 on the assumption that the standard image data is compressed to the target compressed data amount (S101). Specifically, the controlling section 22 calls up a scale factor table for the standard image data from the ROM 21. Then, as shown in FIG. 3, the controlling section 22 sets a value of the scale factor corresponding to the target compressed data amount (S101) to the initial scale factor SF1.

Step S103: The controlling section 22 calculates the values of the quantization table used for the first compression processing by multiplying the value of the standard quantization table by the initial scale factor SF1.

Step S104: The controlling section 22 instructs the compression coding section 18 to perform compression coding on the photographic image data recorded in the second memory 17. The compression coding section 18 performs compression coding on the photographic image data using the value of the quantization table in S103. Further, the photographic image data after compression coding (compression-coded data) is recorded temporarily in the second memory 17.

Here, the photographic image data compressed in S104 has less high-frequency components than the standard image data as described above. Therefore, the compression-coded data in S104 is compressed using the quantization table (S103) to compress the standard image data to the target compressed data amount, so that it always falls below the target compressed data amount (S101).

Step S105: The controlling section 22 determines whether or not the amount of the compression-coded data (S104) is less than Smin1. When it is less than Smin1 (YES side), the procedure proceeds to S106. On the other hand, the data amount being not less than Smin1 (NO side) means that a desired compression result is obtained through the first compression processing; therefore, the controlling section 22 ends the compression coding processing. In this case, the compression-coded data (S104) recorded in the second memory 17 is recorded as final data in the recording medium 23.

Step S106: The controlling section 22 calculates a scale factor SF2 used in the second compression processing.

Specifically, the controlling section 22 estimates sample image data approximated to the photographic image data of the object to be compressed from a combination of the data amount of the compression-coded data (S104) and the initial scale factor SF1. Then, the controlling section 22 calculates the scale factor SF2 corresponding to the target data amount of the second compression using the scale factor table for the estimated sample image data (refer to FIG. 3).

Here, the scale factor SF2 is a value smaller than the initial scale factor SF1. Then, the data amount of compression-coded data by the second compression processing is greater than that by the previous processing. When the difference between the photographic image data of the object to be compressed and the sample image data in S106 is large, the result of the second compression may exceed the target compressed data amount (S101). Therefore, the above-mentioned target data amount of the second compression is set to a value less than the first time target compressed data amount (S101), with a tolerance being taken into consideration.

Step S107: The controlling section 22 replaces the value of SF2 by the value of SFmin when the scale factor SF2 (S106) is less than the SFmin.

Step S108: The controlling section 22 calculates the values of the quantization table used for the second compression processing by multiplying the values of the standard quantization table by the scale factor SF2 (S106 or S107).

Step S109: The controlling section 22 changes the permissible lower limit value of the compressed data amount to Smin2 (Smin2<Smin1) by reducing the initial permissible lower limit value Smin1 of the compressed data amount by a predetermined value.

Step S110: The controlling section 22 instructs the compression coding section 18 to perform compression coding on the photographic image data recorded in the second memory 17. The compression coding section 18 performs compression coding on the photographic image data using the values of the quantization table in S108. Further, the compression-coded data is recorded temporarily in the second memory 17.

Here, as described in S106, the scale factor SF2 is calculated using as a standard a data amount smaller than the first target compressed data amount. Therefore, the compression-coded data in S110 also falls below the target compressed data amount (S101).

Step S111: The controlling section 22 determines whether or not the data amount of the second compression-coded data (S110) is less than Smin2. When it is less than Smin2 (YES side), the procedure proceeds to S112. On the other hand, the data amount being not less than Smin2 (NO side) means that a desired compression result is obtained by the second compression processing, therefore, the controlling section 22 ends the compression coding processing. In this case, the compression-coded data (S110) recorded in the second memory 17 is recorded as final data in the recording medium 23.

Step S112: The controlling section 22 determines whether or not the scale factor SF2 exceeds the SFmin. When the SF2 exceeds the SFmin (YES side), the procedure proceeds to S113.

On the other hand, when the SF2 is the SFmin (NO side), the data amount after compression coding is small as determined in S111 despite that the scale factor is the lower limit value (that is, the compression rate is very low). In other words, it can be determined that the photographic image data of the object to be compressed is a particular image with an extremely small amount of information. In this case, regarding that certain image quality compression processing has been performed using by the Sfmin, the controlling section 22 aborts the compression coding processing. In this case also, the compression-coded data (S110) recorded in the second memory 17 is recorded as final data in the recording medium 23.

Step S113: The controlling section 22 calculates a scale factor SF3 used in the third compression processing.

Specifically, the controlling section 22 calculates the rate of change in the scale factor and the compressed data amount of the photographic image based on the first and second compression results. Then, the controlling section 22 calculates the scale factor SF3 by substituting the target data amount of the third compression for a function found from the above-mentioned rate of change (refer to FIG. 3). When the scale factor table for the sample image data approximated to the above-mentioned rate of change is in the ROM 21, the controlling section 22 may calculate the scale factor SF3 following the same procedure as that in S106 using the above-mentioned scale factor table (not shown).

Here, the scale factor SF3 is a value smaller than the scale factor SF2. Then, the data amount of the compression-coded data by the third compression processing is greater than that by the previous processing. In order to prevent the result of the third compression from exceeding the target compressed data amount (S101), the above-mentioned target data amount of the third compression is also set to a value less than the first target compressed data amount (S101), with a tolerance being taken into consideration.

Step S114: The controlling section 22 replaces the value of SF3 by the value of SFmin when the scale factor SF3 (S113) is less than the SFmin.

Step S115: The controlling section 22 calculates the value of the quantization table used for the third compression processing by multiplying the value of the standard quantization table by the scale factor SF3 (S113 or S114).

Step S116: The controlling section 22 changes the permissible lower limit value of the compressed data amount to Smin3 (Smin3<Smin2) by reducing the permissible lower limit value Smin2 of the compressed data amount by a predetermined amount.

Step S117: The controlling section 22 instructs the compression coding section 18 to perform compression coding on the photographic image data recorded in the second memory 17. The compression coding section 18 performs compression coding on the photographic image data using the values of the quantization table in S108. Then, normally, after the third compression, the compression-coded data falls in the range from the target compressed data amount to Smin3, therefore, the controlling section 22 aborts the compression coding processing here.

Here, after the compression-coded data in S117 is temporarily recorded in the second memory 17, it is recorded as final data in the recording medium 23. Further, as described in S113, the scale factor SF3 is also calculated using as a standard a data amount smaller than the first target compressed data amount. Therefore, the compression-coded data in S117 also falls below the target compressed data amount (S101).

The effects of the first embodiment are described below.

In the first embodiment, the compression-coded data always falls below the target compressed data amount (S104, S110, S117). Therefore, with reservation of a recording region for the target compressed data amount in the second memory 17, it is possible to record the compression-coded data without causing overflow. Therefore, it is possible to record more compression-coded data using a less capacity of the second memory 17, so that reduction of the capacity of the second memory 17 can increase the number of continuously shot frames, or reduce the cost without deteriorating the continuous shooting performance of an electronic camera.

Further, in the first embodiment, the value of the scale factor decreases sequentially, therefore, it is not necessary to search for a scale factor greater than the previous one in calculation of the second and subsequent scale factors. Accordingly, it is possible to calculate the scale factor at higher speed.

Furthermore, in the first embodiment, the permissive range (between the target compressed data amount and the permissive lower limit value) of the compression is extended as the number of times of compression processing increases, therefore, it becomes more likely that the compression result falls in the permissive range. This can realize high-speed compression coding processing.

Description of Second Embodiment

Figure 4:
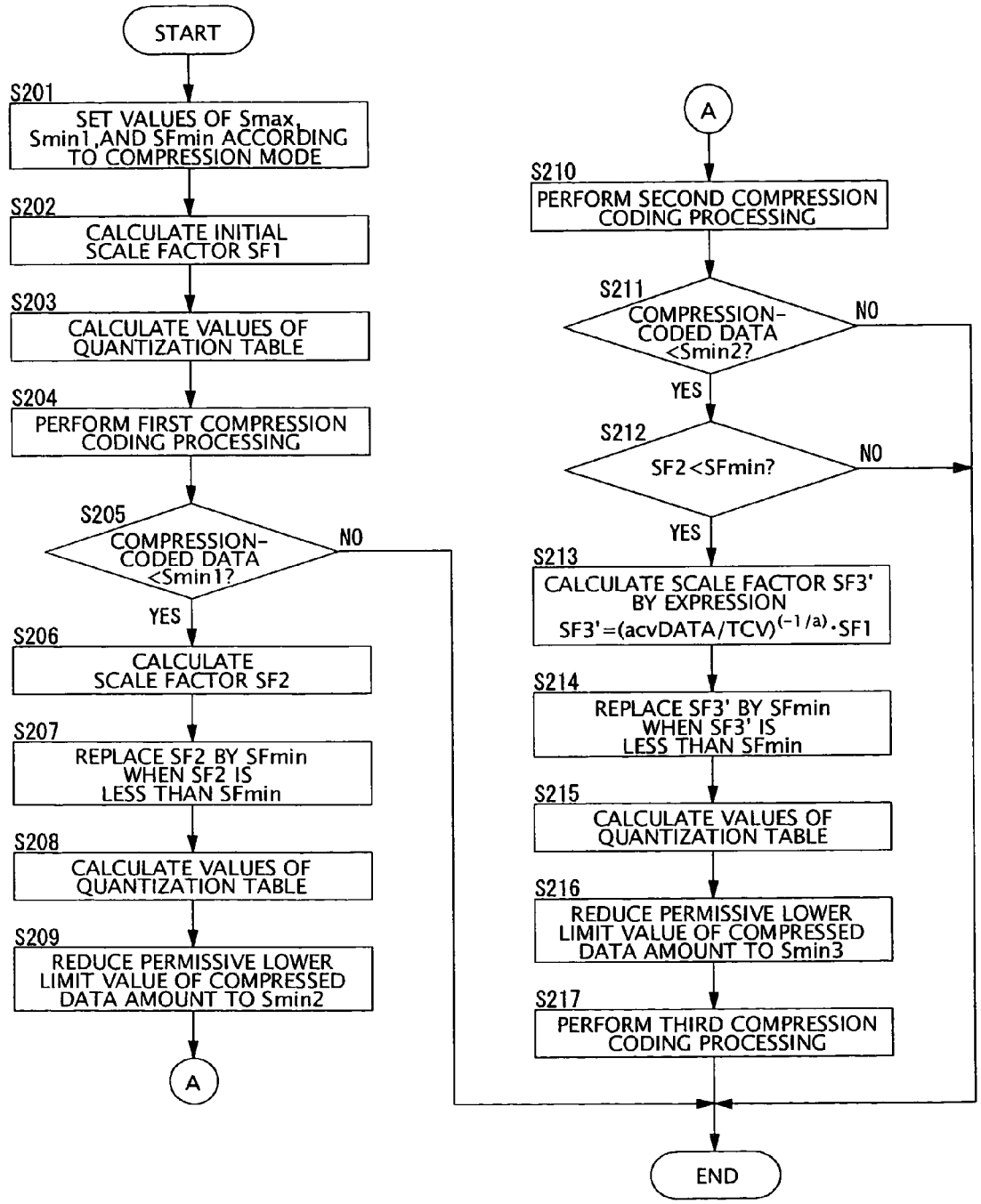
FIG. 4 is a flow chart of compression coding processing on photographic image data in a second embodiment.

FIG. 4 is a flow chart for describing compression coding processing on photographic image data by an electronic camera in a second embodiment. The second embodiment is a modification of the first embodiment and differs from the first embodiment only in calculation processing (S213) of the scale factor SF3.

Therefore, in the second embodiment, the components common to those in the first embodiment are assigned with the same symbols and their description is omitted. Further, the description of each step except for S213 in FIG. 4 is omitted because it is substantially the same as that of each of the steps with the corresponding number in the first embodiment.

Step S213: The controlling section 22 calculates a scale factor SF3' used in the third compression processing based on the following expression (1).

$$SF3' = (acvDATA/TCV)^{(-1/a)} \cdot SF1 \quad (1)$$

In the above-mentioned expression (1), "acvDATA" is the data amount (S204) of the first compression-coded data. "TCV" is the target data amount of compression by the third compression processing. It is preferable to set the target data amount of the third compression to a value smaller than the first target compressed data amount taking tolerance into consideration. Further, "a" is a constant that defines the rate of change (gradient) of the scale factor and the compressed data amount of the photographic image. Furthermore, "SF1" is the initial scale factor (S202).

Here, as for the constant a, a plurality of values is recorded in advance in the ROM 21. The constant a recorded in the ROM 21 is acquired, for example, by finding statistical data of the scale factor table using a method such as regression analysis. Further, the controlling section 22 in S213 performs calculation by the expression (1) by selecting a value with higher reliability among the above-mentioned plurality of values of a.

The reason that the scale factor is calculated by the expression (1) in the second embodiment is described below with reference to FIG. 5.

Figure 5:
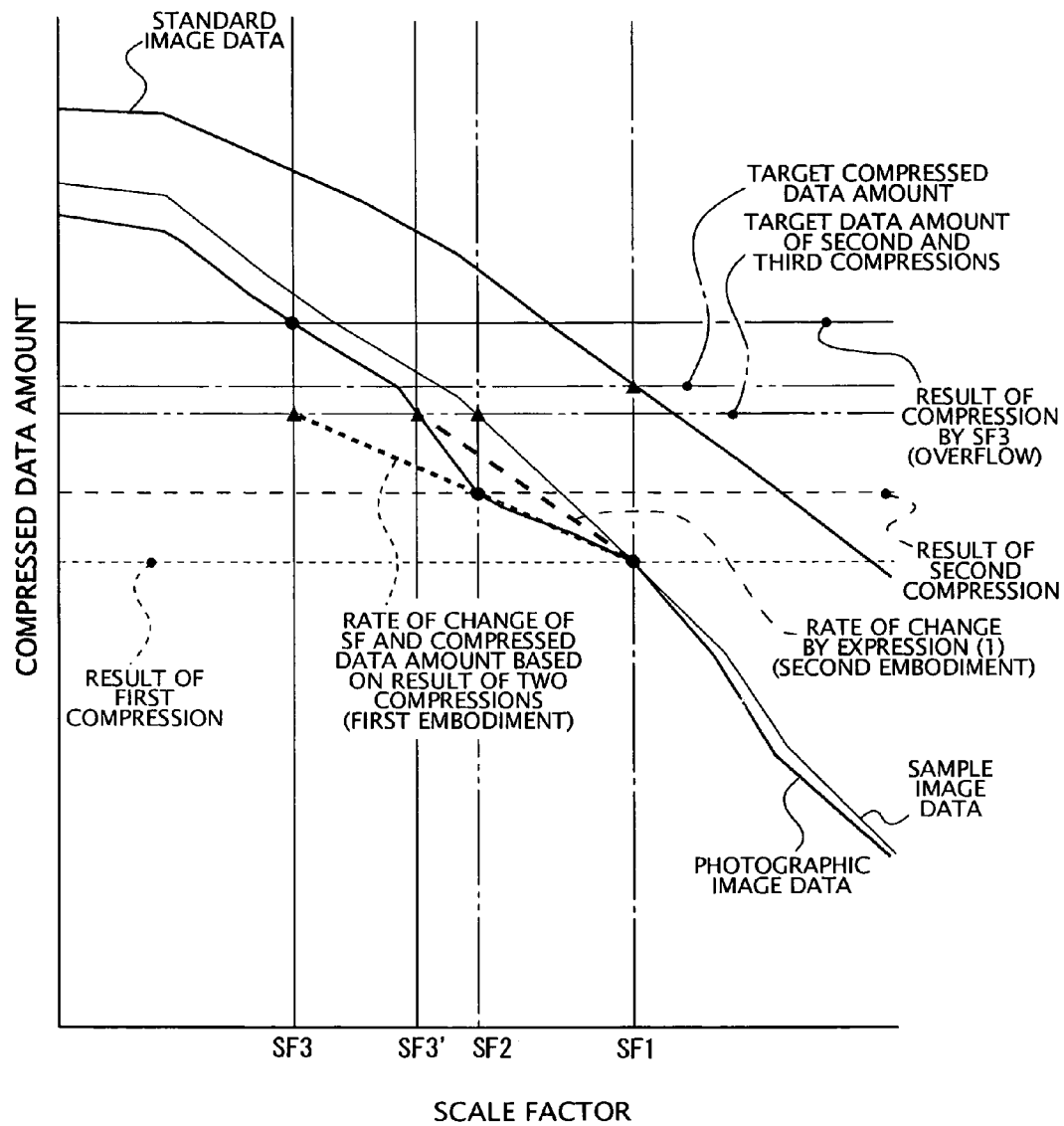
FIG. 5 is an explanatory diagram of derivation of a scale factor SF3' in the second embodiment.

In FIG. 5, calculating SF 3 based on the first and second compression results as in the above-mentioned S113 may cause a problem that the compression-coded data exceeds the target compressed data amount at a portion at which the relationship between the scale factor and the compressed data amount varies exceptionally largely. Therefore, in the second embodiment, the controlling section 22 calculates the scale factor SF3' by selecting a value of a with high reliability and using the expression (1) instead of calculating SF3 based on the first and second compression results.

In the second embodiment, in addition to the substantially same effects as those in the above-mentioned first embodiment, it is made possible to cause the data amount of the compression-coded data to be equal to or less than the target compressed data amount with high precision.

(Supplementary Items of the Embodiments)

(1) In the present invention, the standard image data for calculating the initial scale factor SF1 is not limited to the examples in the above-mentioned embodiments. For example, among the sample image data a photographic image that includes the high-frequency components most may also be used as standard image data. Further, artificial test pattern data varying with a cyclic width of about a digit pixel in the horizontal and vertical directions may also be used.

(2) The above-mentioned embodiments has described the examples in which compression processing is aborted after performed three times; however, according to the present invention, fourth or subsequent compression processings may be performed if necessary.

(3) Compression coding processing according to the imaging device of the present invention may be realized by, for example, software of a personal computer.

(4) The imaging device of the present invention may also be configured that it finds a scale factor from the standard correlation data in the above-mentioned embodiments and ends the compression processing after the first compression.

The present invention is not limited to the above embodiments and various modifications may be made without departing from the spirit and scope of the invention. Any improvement may be made in part or all of the components.

What is claimed is:

1. An imaging device comprising:
    an image pickup section that generates photographic image data by photoelectrically converting an object image obtained by an optical shooting system;
    a compression processing section that performs compression processing on said photographic image data;
    a correlation data holding section that holds a plurality of pieces of correlation data representing a correlation between a change in a scale factor for a data compression rate and a change in compressed data amount of sample image data;
    a first calculating section that calculates an initial scale factor from target compressed data amount and standard correlation data that is generated according to test pattern image data whose cyclic variation of a pattern in horizontal and vertical directions corresponds to a Nyquist frequency of said image pickup section, the test pattern image data being one of said sample image data; and
    a second calculating section that determines whether or not recompression processing needs to be performed by use of a different scale factor, according to a difference between said target compressed data amount and an amount of compressed photographic image data, and when the recompression processing is performed, calculates a scale factor according to the compressed photographic image data and said correlation data so that said data compression rate is decreased.

2. The imaging device according to claim 1, wherein said second calculating section performs a different processing from a previous processing at the recompression processing.

3. The imaging device according to claim 2, wherein when determining whether or not recompression processing needs to be performed, said second calculating section increases stepwise an allowable range of the difference between said target compressed data amount and the amount of compressed photographic image data.

4. The imaging device according to claim 3, wherein at second and subsequent recompression processings, said second calculating section calculates said scale factor by an arithmetic expression different from a previous arithmetic expression in a rate of change of said scale factor and said compressed data amount.

5. The imaging device according to claim 2, wherein at second and subsequent recompression processings, said second calculating section calculates said scale factor by an arithmetic expression different from a previous arithmetic expression in a rate of change of said scale factor and said compressed data amount.

6. The imaging device according to claim 1, wherein said amount of compressed photographic image data falls below said target compressed data amount.

7. The imaging device according to claim 6, wherein said second calculating section performs a different processing from a previous processing at the recompression processing.

8. The imaging device according to claim 7, wherein when determining whether or not recompression processing needs to be performed, said second calculating section increases stepwise an allowable range of the difference between said target compressed data amount and the amount of compressed photographic image data.

9. The imaging device according to claim 8, wherein at second and subsequent recompression processings, said second calculating section calculates said scale factor by an arithmetic expression different from a previous arithmetic expression in a rate of change of said scale factor and said compressed data amount.

10. The imaging device according to claim 7, wherein at second and subsequent recompression processings, said second calculating section calculates said scale factor by an arithmetic expression different from a previous arithmetic expression in rates of change of said scale factor and said compressed data amount.

11. An imaging device comprising:
    an image pickup section that generates photographic image data by photoelectrically converting an object image obtained by an optical shooting system;
    a correlation data holding section that holds standard correlation data on test pattern image data which corresponds to a Nyquist frequency of said image pickup section, the standard correlation data representing a relationship between a change in a scale factor for a data compression rate and a change in compressed data amount;
    a calculating section that finds said scale factor for compression processing according to said standard correlation data; and
    a compression processing section that performs compression processing on said photographic image data based on a calculation result of said calculating section.

* * * * *